No. 856,220. PATENTED JUNE 11, 1907.
F. E. BRUECKNER.
BEER FAUCET.
APPLICATION FILED MAR. 24, 1906.
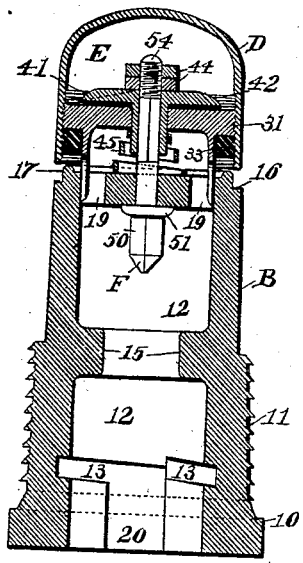

UNITED STATES PATENT OFFICE.

FRIEDRICH E. BRUECKNER, OF LAWRENCE, MASSACHUSETTS.

BEER-FAUCET.

No. 856,220. Specification of Letters Patent. Patented June 11, 1907.

Application filed March 24, 1906. Serial No. 307,948.

*To all whom it may concern:*

Be it known that I, FRIEDRICH E. BRUECK-NER, a citizen of the United States, residing at Lawrence, in the county of Essex and State of Massachusetts, have invented certain new and useful Improvements in Beer-Faucets, of which the following is a specification.

My invention relates to faucets for drawing liquids from casks, barrels and other receptacles and more particularly to that class of faucets which remain in the barrel with their valves kept closed, until, by the insertion of a spigot, their valves are opened to permit the passage of liquid from the barrel, which then passes through the faucet and spigot and is controlled by the cock of the spigot.

My invention is especially adapted for barrels, kegs and other packages containing beer or ale. It is well known that in this class of barrels, it is necessary to coat the interior with pitch, varnish, or similar material, in order to keep the taste of the wood out of the liquid and to prevent the gases etc from leaking. As the class of faucet to which my invention relates is intended to remain in the barrel at all times, it occurs that while the melted pitch or varnish is being applied, it very often gets into the valve of the faucet and renders it useless.

The principal object of my invention is to provide a permanent faucet, which, when not in use, will present a perfectly tight metal joint on the inside of the cask, a joint which can not be clogged and which will protect the working parts and the rubber washer from injury by the hot pitch.

My invention is illustrated in the accompanying drawings in which—

Figure 1 is a section of the faucet with the valve open. Fig. 2 is a view of the spigot as attached to the faucet, the faucet being shown in partial section and with the valve closed. Fig. 3 is a top view of the faucet with the working parts of the valve removed. Fig. 4 is a view of the top of the valve with the cap removed. Fig. 5 is an elevation of the valve with the cap and cylinder removed. Fig. 6 shows the form of legs 34.

A is a portion of the barrel or cask, into which is forced or preferably screwed, the hollow cylinder B. C is the spigot. D is the cap. E is the valve.

The cylinder B is of an old and well known construction and comprises a flange 10 which is on the outside of the barrel and screw threads 11. Its inside chamber 12, in which is the straight groove 20 and the oblique grooves 13, is narrowed by the annular shoulder 15. Cylinder B is tapered toward the end opposite flange 10, and on the outside at this end, it is grooved to form an annular recess 16 and an annular shoulder 17. This smaller end, which is inside the barrel, is closed but has a circular orifice 18 and two oval orifices 19.

The spigot C is provided with a cock 21 and receives the liquid through orifices 22 and discharges the liquid through the orifice at 23. It carries an elastic washer 24 which rests against shoulder 15 and is compressed so as to make a tight joint by the action of inserting spigot C and turning it to lock it in place. This locking is done by the action of projections 25 which pass down the groove 20 and force inward spigot C when it is turned, as they are then forced along the oblique grooves 13, 13. They thus also hold spigot C in place.

The valve E comprises a plunger 31 which is circular in form, as shown in Fig. 4, and has a circular orifice in the center and also carries a ring 33, from which project two series of double legs 34, which are adapted to pass through orifices 19 and serve as guides for valve E. An elastic washer 35 circles the ring 33 and serves to make a tight joint between valve E and shoulder 17. Plunger 31 and washer 35 are screw threaded to permit the metal cap D to be screwed upon them, thereby itself being held in place and also holding washer 35 in place. Upon the top of plunger 31 are two oppositely disposed sectional end cams 36 and 37.

A stem F passes through orifice 18 and up through the orifice in plunger 31 and comprises a triangular or squared end 50 adapted to engage a similar triangular or square orifice in the inner end of spigot C, a shoulder 51, a cylindrical portion 52 which passes through orifice 18; a squared portion where it passes through cylinder 43 and a screw threaded end 54. The wings 41 and 42 are extended from a cylinder 43, which is adapted to pass through the orifice in plunger 31 and is squared on its inside surface to fit the squared section of the stem F which comes between 52 and 54. The nuts 44 hold the cylinder and wings in place on the stem F. A spiral spring 45 tends to force valve E away from the end of cylinder B and opens the valve at the right time. This spring 45 is preferably made from a flat strip of metal so wound as to form a helical spiral capable of being compressed into itself, as shown, but an ordinary helical spring may be used.

The action is as follows:—Fig. 1 shows the valve open, and in this position the liquid can pass through between shoulder 17 and the edge of cap D, thence through orifices 19 into chamber 12 and from there through the orifices 22 into the spigot. This is the position of the parts when spigot C is inserted and locked in place. It will be seen that the normal tendency of spring 45 is to keep the valve open. To close the valve the spigot C is given a quarter turn and this turns the stem F, carrying with it the wings 41, 42. As wings 41, 42 turn, they are forced along the slanting surfaces of cams 36, 37, and as shoulder 51 prevents any yielding by stem F, it will be seen that plunger 31 carrying cap D and washer 35 are forced against shoulder 17 at the same time that the edge of cap D is forced down into annular groove 16, thus closing the faucet. As the cap D is screw threaded, it can be adjusted with the utmost nicety to make a perfectly tight joint with cylinder B and this joint effectively prevents the pitch or varnish from touching or getting into the working parts.

It will be understood that, as is usual with this class of device, spigot C is inserted and given a quarter turn, which has the effect of locking it in place and also opening valve E, thus permitting the liquid to be discharged. When all or enough liquid has been drawn, a quarter turn in the opposite direction is given to spigot C, which allows it to be withdrawn and also closes the valve as shown in Fig. 2.
The advantages of my invention are that the rubber washer being inside of cap D, is protected from the heat of the pitch. Besides this, any workman can replace the washer with a new one as it is slipped on and is not burned or glued on, as are some others. Also, as there is no twisting of the washer but only a straight pressure, the washer wears much longer. The cap D can not be unscrewed when the valve is closed, on account of the great friction of washer 35 which is then under compression. The spigot can never get caught in the faucet, as all the parts are positive in their action and the plunger 31 cannot turn on account of the guide legs.

I prefer to make all the parts of tinned brass.

What I claim as my invention and desire to cover by Letters-Patent is:—

1. In a beer faucet, a hollow cylinder comprising a closed inner end provided with a central circular aperture and passages for the liquid, a plunger provided with sectional end cams and legs adapted to pass through said passages and to serve as guides, a screw cap carried by the plunger, a stem adapted to pass through the central aperture in the cylinder and the center of the plunger, wings carried by the stem and adapted to coöperate with the end cams, a spring adapted to open the valve, and a spigot adapted to fit inside the cylinder and to turn the stem.

2. In a beer faucet, a hollow cylinder with a closed inner end provided with a central aperture and passages, a valve comprising a plunger provided with guides and end cams and a stem with wings adapted to operate the end cams, a spring adapted to keep the valve open, a cap carried by the valve, and a spigot adapted to turn its stem and so operate the valve.

3. In a beer faucet, a hollow cylinder comprising a closed inner end provided with apertures for the passage of liquid together with an annular shoulder and an annular channel, combined with a cam actuated spring valve adapted to slide to and from the end of said cylinder, an elastic washer adapted to engage said shoulder and carried by the valve, a screw cap carried by the valve and adapted to enter and close the annular recess in the cylinder, and a spigot adapted to operate the valve as described.

4. In a beer faucet, a hollow cylinder comprising a closed inner end provided with a central orifice and passages for the liquid, a stem adapted to pass through said central orifice and having a shoulder to hold it in place, wings carried by the stem, a plunger comprising sectional end cams and a ring from which project guide legs, a helical spring located between the plunger and cylinder end, and an elastic washer carried by the ring of the plunger, combined with a screw cap carried by the plunger, and a spigot adapted to turn the stem as described.

5. In a beer faucet, a hollow cylinder comprising a closed inner end provided with a central orifice and passages for the liquid, a stem adapted to pass through said central orifice and having a shoulder to hold it in place, wings carried by the stem, a plunger comprising sectional end cams and a ring from which project guide legs, a helical spring located between the plunger and cylinder end, an elastic washer carried by the ring of the plunger, and a spigot adapted to turn the stem as described.

6. In a beer faucet, a hollow cylinder comprising a closed inner end provided with a central orifice and passages for the liquid together with an annular shoulder and an annular channel, a stem adapted to pass through said central orifice and having a shoulder to hold it in place, wings carried by the stem, a plunger comprising sectional end cams and a ring from which project guide legs, a helical spring located between the plunger and the cylinder end, and an elastic washer carried by the ring of the plunger, combined with a screw cap carried by the plunger, and a spigot adapted to turn the stem as described.

7. In a faucet valve for beer barrels, a valve seat, a stem comprising a shoulder and adapted to pass through said seat, wings carried by the stem, a plunger comprising sectional end cams and a ring from which project guide legs, a helical coiled band spring interposed between the plunger and valve seat, and an elastic washer carried by the ring of the plunger.

In testimony whereof I affix my signature in presence of two witnesses.

FRIEDRICH E. BRUECKNER.

Witnesses:
   HENRY J. KOELLEN,
   PAUL R. CLAY.